US005804754A

United States Patent [19]

Iwase et al.

[11] Patent Number: 5,804,754

[45] Date of Patent: Sep. 8, 1998

[54] WAVE TABLE SOUND SOURCE CAPABLE OF PROCESSING EXTERNAL WAVEFORM

[75] Inventors: Hiroyuki Iwase; Tatsuya Nonaka; Takeo Shibukawa; Takashi Maruyama, all of Hamamatsu, Japan

[73] Assignee: Yamaha Corporation, Japan

[21] Appl. No.: 813,649

[22] Filed: Mar. 7, 1997

[30] Foreign Application Priority Data

Mar. 11, 1996 [JP] Japan .................................... 8-081984

[51] Int. Cl.[6] .............................. G10H 7/00; G10H 1/22; H04J 3/00

[52] U.S. Cl. .................................................. 84/61; 84/625

[58] Field of Search .............................. 84/600, 602, 603, 84/604, 615, 617, 625

[56] References Cited

FOREIGN PATENT DOCUMENTS 6-202639 7/1997 Japan .

*Primary Examiner*—William M. Shoop, Jr.
*Assistant Examiner*—Jeffrey W. Donels
*Attorney, Agent, or Firm*—Graham & James LLP

[57] ABSTRACT

A music apparatus is provided with a memory device that stores waveform data, and a sound device that has a plurality of tone generating channels, each of which is tuned in normal setting effective to process the waveform data retrieved from the memory device so as to generate a musical sound. An input device is placed in either of an active state for inputting external waveform data and an inactive state where the external waveform data is not inputted. A detector device is provided to produces a detection signal when the input device switches between the active state and the inactive state. A control device responds to the detection signal when the input device switches to the active state for controlling the sound device to change at least one of the tone generating channels from the normal setting to alternative setting effective to admit and process the external waveform data inputted from the input device so as to generate an additional sound so that the sound device can generate mixture of the musical sound and the additional sound. Otherwise, the control device responds to the detection signal when the input device switches to the inactive state for controlling the sound device to restore that one tone generating channel from the alternative setting to the normal setting so that the sound device generates the musical sound alone.

13 Claims, 8 Drawing Sheets

WAVE TABLE SOUND SOURCE CAPABLE OF PROCESSING EXTERNAL WAVEFORM

BACKGROUND OF THE INVENTION

The present invention relates to a music apparatus having a sound source of a wave table type which generates a musical sound based on waveform data stored in an internal memory, and which is adapted to process externally inputted waveform data to generate an effect-added sound such that the music sound and the effect-added sound are mixed with each other.

Conventionally, the sound source is utilized to generate or synthesize a musical sound of karaoke accompaniment to accompany with a live singing voice. In such a case, a separate effector is provided to impart an echo effect or else to the live singing voice. A mixer mixes the output from the sound source and the output from the effector with each other, and feeds the mixed results to a loudspeaker. In another application, the sound source is utilized to perform minus-one play such that the sound source is driven to generate plural parts of instrumental music sounds except for one part reserved for live performance by a guitar or else. The instrumental music sounds generated by the sound source accompany with the live guitar sound. In such a case, the live guitar sound is processed to impart thereto an effect such as distortion, and is then mixed with the synthesized instrumental music sounds.

A recent electronic musical instrument is installed with a sound source which integrates therein an effector adapted to process the external waveform to apply thereto a desired effect. In such an electronic musical instrument, an additional mixer is connected to an input of the internal effector integrated in the sound source. This additional mixer receives the external waveform data which is converted from an analog audio signal picked up by a microphone, and mixes the external waveform data with the internal waveform data. Then, the mixed waveform data are fed to the effector. However, the provision such an additional mixer may disadvantageously complicate circuit structure of the sound source.

SUMMARY OF THE INVENTION

An object of the invention is to provide a music apparatus which can feed external waveform data to an effector integrated in an internal sound source.

According to the present invention, a music apparatus comprises a memory device that stores waveform data, a sound device that has a plurality of tone generating channels, each of which is normally maintained in a normal setting effective to process the waveform data retrieved from the memory device so as to generate a musical sound, an input device that is placed in either of an active state for inputting external waveform data and an inactive state where the external waveform data is not inputted, and a control device that operates when the input device switches to the active state for controlling the sound device to change at least one of the tone generating channels from the normal setting to an alternative setting effective to admit and process the external waveform data inputted from the input device so as to generate an additional sound so that the sound device can generate a mixture of the musical sound and the additional sound, and that otherwise operates when the input device switches to the inactive state for controlling the sound device to restore said one tone generating channel from the alternative setting to the normal setting so that the sound device generates the musical sound alone.

Preferably, the music apparatus further comprises a detector device that detects when the input device is electrically connected to the sound device and when the input device is disconnected from the sound device for notifying the control device that the input device switches between the active state and the inactive sate. Alternatively, the music apparatus further comprises a detector device that detects when the input device actually starts inputting of the external waveform data and when the input device actually stops inputting of the external waveform data for notifying the control device that the input device switches between the active state and the inactive state.

In a specific form, the sound device includes a multiplexer that sequentially allots a time slot to each of the tone generating channels in a time-divisional manner such that each tone generating channel processes the waveform data at the allotted time slot, and an accumulator that accumulates the processed waveform data to generate the musical sound. Further, said one tone generating channel operates under the normal setting for sequentially addressing the memory device to read out therefrom the waveform data so as to synthesize the musical sound, and otherwise operates under the alternative setting for sequentially admitting the external waveform data from the input device so as to reproduce the additional sound. Moreover, said one tone generating channel operates under the normal setting for processing the waveform data so as to synthesize the musical sound, and otherwise operates under the alternative setting for processing the external waveform data so as to impart an acoustic effect to the additional sound. Preferably, the sound device operates when the input device is switched to the active state for designating one of the tone generating channels, which is currently not processing the waveform data so that the designated tone generating channel is changed from the normal setting to the alternative setting so as to process the external waveform data.

In a specific form, the input device comprises an audio input for providing an original sound in the form of an analog audio signal, a converter for converting the analog audio signal into the external waveform data, and a buffer for storing the external waveform data so that said one tone generating channel processes the stored external waveform data so as to generate the additional sound which is a modified form of the original sound. Further, the detector device includes a switch which is actuated when the audio input is electrically connected to the sound device for detecting the active state of the input device. In such a case, the sound device operates said one tone generating channel to address the buffer to retrieve therefrom the external waveform data, and operates other tone generating channels than said one tone generating channel to address the memory device to retrieve therefrom the waveform data.

DETAILED DESCRIPTION OF THE INVENTION

Figure 1:
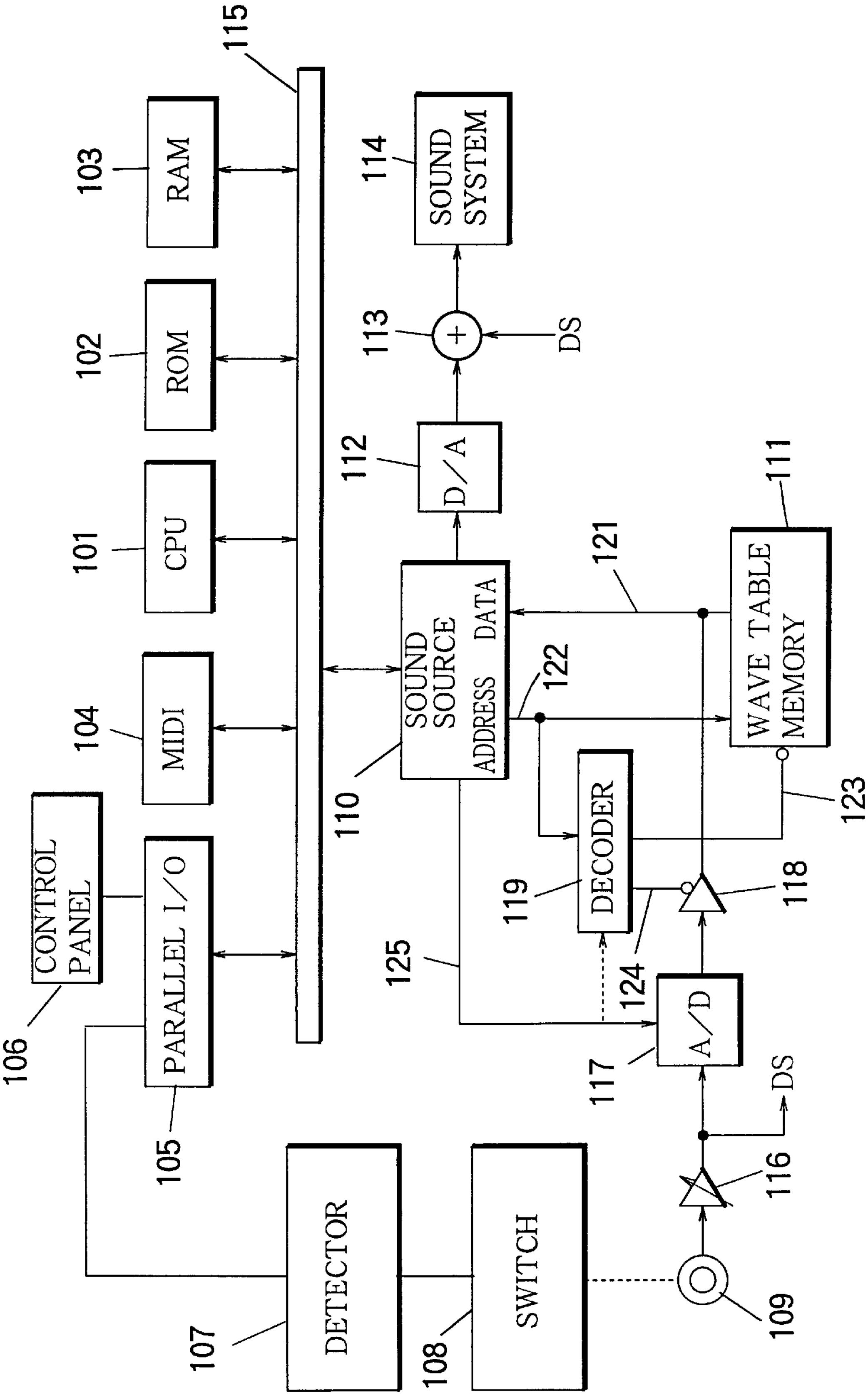
FIG. 1 is a block diagram showing one embodiment of the inventive music apparatus practiced in the form of an electronic musical instrument.

FIG. 1 is a block diagram showing an embodiment of the inventive music apparatus incorporated in an electronic musical instrument. The electronic musical instrument is comprised of a central processing unit (CPU) 101, a read only memory (ROM) 102, a random access memory (RAM) 103, a Musical Instrument Digital Interface (MIDI) 104, a parallel input/output interface (I/O) 105, a control panel 106, a plug-in/plug-out detector 107, a microswitch 108, an input connector 109, a sound source 110, a wave table memory 111, a digital/analog (D/A) converter 112, an adder 113, a sound system 114, an amplifier 116, an analog/digital (A/D) converter 117, a buffer 118 and a decoder 119. A bus line 115 interconnects those of CPU 101, ROM 102, RAM 103, MIDI 104, parallel I/O 105 and sound source 110.

The CPU 101 controls operation of the entire system of the electronic musical instrument. The ROM 102 stores a control program executed by the CPU 101 and various control parameters. The RAM 103 provides a work area for the CPU 101. The MIDI 104 is an interface for connection with an external MIDI device (not shown), which provides an MIDI message including a note-on event and other events. The control panel 106 includes manual switches and indicators connected to a port of the parallel I/O 105. The CPU 101 detects switch operation of the control panel 106 through the parallel I/O 105 and displays various information on the indicators of the control panel 106.

The input connector 109 of a female type is connected to a signal line for inputting an analog audio signal representative of an external waveform. The input connector 109 can receive therein a male jack (not shown) connected to the signal line which transmits the waveform from an external signal source such as a microphone or an electronic musical instrument. The microswitch 108 is turned on and off in response to plug-in and plug-out of the male jack at the female input connector 109. The detector 107 detects on and off of the microswitch 108 and feeds the detected result to a port of the parallel I/O 105. The CPU 101 polls the port to detect when an input device including the connector 109 switches between an active state where the external waveform is inputted and an inactive state where the external waveform is not inputted.

The sound source 110 has 32 tone generating channels, and operates according to instructions from the CPU 101 to drive the tone generating channels in time-divisional manner. In detail, the sound source 110 is composed of a sound device for sequentially reading out waveform data from the wave table memory 111, and for applying various processings such as filtering, volume controlling, channel accumulating and effect-imparting to the waveform data to thereby generate a musical sound. The sound source 110 has an address bus 122 for transmitting a reading address and a data bus 121 for receiving the waveform data. The D/A converter 112 converts digital data of the musical sound into a corresponding analog audio signal. The adder 113 mixes the analog audio signal with another analog audio signal DS fed from the amplifier 116, and outputs the mixed signals to the sound system 114 including a loudspeaker.

This electronic musical instrument feeds the external waveform inputted through the connector 109 to the sound source 110. The sound source 110 utilizes its own functions to process the fed external waveform to apply thereto acoustic effects. The sound source 110 internally mixes the processed external waveform with the regular waveform of the musical sound which is synthesized by sequentially reading out waveform data from the wave table memory 111.

The amplifier 116 adjusts a signal level of the analog waveform externally inputted from the input connector 109. The output of the amplifier 116 is fed to the A/D converter 117 and the adder 113. The A/D converter 117 converts the externally inputted analog waveform into a corresponding digital waveform. The buffer 118 stores the digital waveform fed from the A/D converter 117. An output of the buffer 118 is connected to the data bus 121 of the sound source 110 in parallel to the data output of the table wave memory 111.

The decoder 119 decodes the reading address fed from the sound source 110 through the address bus 122 so as to selectively enable outputting of the wave table memory 111 and the buffer 118. The sound source 110 has an address map including a first address area allotted to the wave table memory 111 and a second address area allotted to the buffer 118. The second address area is written with an A/D address which is used to request admission of the external waveform by the sound source 110. The decoder 119 operates when the reading address is issued from the first address area for enabling the outputting of the wave table memory 111 through a control signal line 123, and otherwise operates when the A/D address is issued from the second address area for enabling the outputting of the buffer 118 through another control signal line 124. When the wave table memory 111 is enabled, the internal waveform data designated by the issued address is read out from the wave table memory 111 and inputted into the sound source 110. Otherwise, when the buffer 118 is enabled, the external waveform data is read out from the buffer 118 in response to the A/D address and is fed to the sound source 110. By such a manner, the sound source 110 issues the A/D address as the reading address to the address bus 122 to retrieve or admit the external waveform data from the buffer 118. The sound source 110 can access both of the buffer 118 and the wave table memory 111 by means of the common address bus 122.

A clock signal line 125 is connected for transmitting a clock or synchronization signal from the sound source 110 to the A/D converter 117. The A/D converter 117 periodically performs the A/D conversion in response to the clock signal.

In the electronic musical instrument shown in FIG. 1, the sound source 110 operates when the external waveform data is not inputted since the plug is disconnected from the input connector 109 for normally setting all of the first to thirty-second channels to sequentially read out the internal waveform data from the wave table memory 111 so as to generate the musical sound under the control by the CPU 101. Such a synthesis method of the musical sound is called "wave table tone generation". On the other hand, when the plug is inserted into the input connector 109 to feed the external waveform data, the sound source 110 designates the thirty-second or last channel to treat the external waveform by changing the normal setting thereof to alternative setting. Namely, the sound source 110 operates during a time slot allotted to the last channel to retrieve the external waveform data so that the last channel processes the external waveform data using internal digital signal processing functions of the sound source 110 so as to apply acoustic effects to the external waveform data to thereby reproduce the effect-added sound. Further, the sound source 110 internally mixes the effect-added sound with the regular musical sound generated by the remaining channels according to the wave table reading method. The sound source 110 automatically switches the last tone generating channel between the normal setting and the alternative setting upon detection of plug-in and plug-out of the input connector 109 so as to admit and process the external waveform data, if required, concurrently with the internal waveform data without complicating device construction of the sound source 110.

Figure 2:
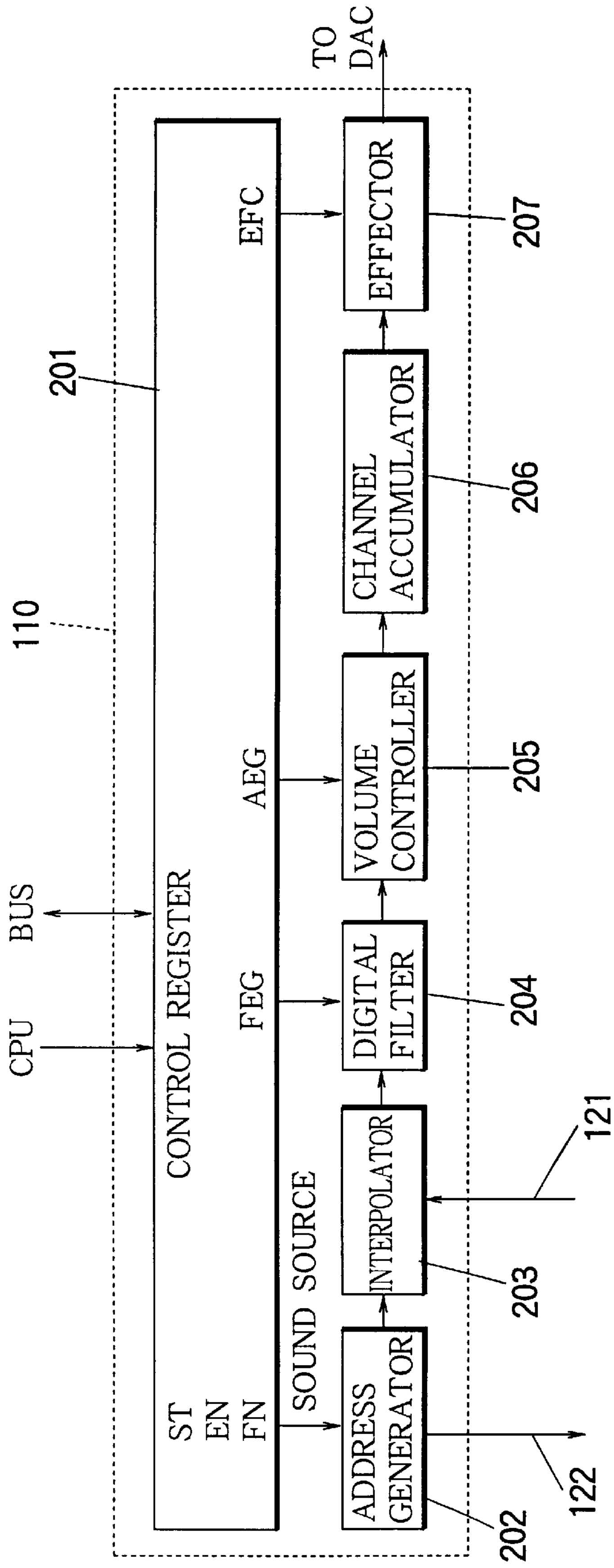
FIG. 2 is a block diagram showing detailed structure of a sound source installed in the inventive music apparatus.

FIG. 2 is a detailed block diagram of the sound source 110. The sound source 110 is composed of a control register 201, an address generator 202, an interpolator 203, a digital filter 204, a volume controller 205, a channel accumulator 206 and an effector 207. The sound source 110 is implemented by a digital signal processor (DSP) and associated microprograms. FIG. 2 shows a functionally equivalent circuit structure of the DSP driven by the microprograms.

The control register 201 registers setting information such as initialization commands and control parameters fed from the CPU 101. The CPU 101 writes the setting information into the control register 201 for each of the tone generating channels to place the same in either of the normal setting and the alternative setting. As shown in FIG. 2, the setting information includes a pair of start address ST and end address EN which determines a reading section of the wave table memory, a frequency number FN which determines a reading pitch of the wave table memory, a filtering parameter FEG, an envelope parameter AEG and an effect parameter EFC. The CPU 101 registers those setting information into the control or configuration register 201 for each of the tone generating channels, and further issues a tone generation command. Particularly, with regard to a tone generating channel designated for treating the external waveform data, the CPU 101 sets the control register 201 with the start address ST, the end address EN and the frequency number FN, those of which are determined to enable the address generator 202 to generate the A/D address for accessing the buffer 118 in place of the wave table memory 111. For example, the frequency number FN is set to "0" while the start and end addresses ST and EN are set corresponding to the A/D address. The A/D address may have a given range. Further, a loop address may be set if possible and the given range is determined as an infinite loop to thereby generate a desired address value within the given range of the A/D address.

Upon reception of the tone generating command from the CPU 101, the sound source 110 starts the tone generating operation at designated one of the channels. First, the address generator 202 generates a reading address which is calculated by successively adding the frequency number FN to a top of the reading section defined between the start address ST and the end address EN. The reading address is transmitted to the address bus 122. In case that the parameters ST, EN and FN are registered for the alternative or optional setting, the address generator 202 transmits the A/D address to the address bus 122 in place of the reading address. Further, the address generator 202 outputs phase information to the interpolator 203 for interpolation processing of the retrieved waveform data.

As shown in FIG. 1, the decoder 119 operates when the address generator 202 issues the reading address or memory address directed to the wave table memory 111 for retrieving the waveform data from the wave table memory 111. On the other hand, when the address generator 202 issues the A/D address or buffer address, the decoder 119 operates to retrieve the external waveform data from the buffer 118. The retrieved waveform data is fed to the interpolator 203 through the data bus 121. The interpolator 203 interpolates the waveform data, and then feeds the waveform data to the digital filter 204. The digital filter 204 filters the waveform data according to the parameter FEG set in the register 201, and then feeds the waveform data to the volume controller 205. The volume controller 205 applies an envelope to the waveform data according to the parameter FEG set in the register 201, and then feeds the waveform data to the channel accumulator 206. The channel accumulator 206 accumulates the waveform data. Further, the effector 207 applies the acoustic effect to the accumulated results of the waveform data according to the parameter FEC set in the register 201 to form a final digital audio signal of the sound. The digital audio signal is fed to the D/A converter 112 from the sound source 110.

As described above, the sound source 110 can process both of the external waveform data inputted from the buffer 118 and the internal waveform data retrieved from the wave table memory 111 in parallel manner. Therefore, the sound source 110 can apply various processings including filtering, volume controlling, channel accumulating and effect-adding by means of the internal circuits 204–207 without altering hardware construction of the sound source 110. The sound source 110 can output mixed ones of the music sound generated by processing the internal waveform data according to the wave table reading method and the additional sound generated by processing the external waveform data without connecting an additional mixer to an input terminal of the effector 207.

The sound source 110 conducts the filtering process to control timbres of the musical sound by the digital filter 204 and the volume controlling process by the volume controller 205 in time-divisional manner for each of the tone generating channels according to the control parameters which are set independently for each channel. The tone generating channel assigned to the external waveform also operates to carry out the various waveform processings according to the control parameters specifically customized to treat the external waveform. Further, the channel accumulator 206 carries out the channel accumulation of the processed waveform data for seven groups each containing desired ones of the 32 channels. Stated otherwise, the 32 numbers of the tone generating channels are divided into the seven groups. The effector 207 applies desired effects to respective musical sounds created by the seven groups of the channels. The external waveform processed by the designated channel alone can be supplied to one of the seven groups of the channel accumulator 206 separately from the remaining channels, and is then imparted with an acoustic effect which is specifically arranged for the external waveform.

Figure 3:
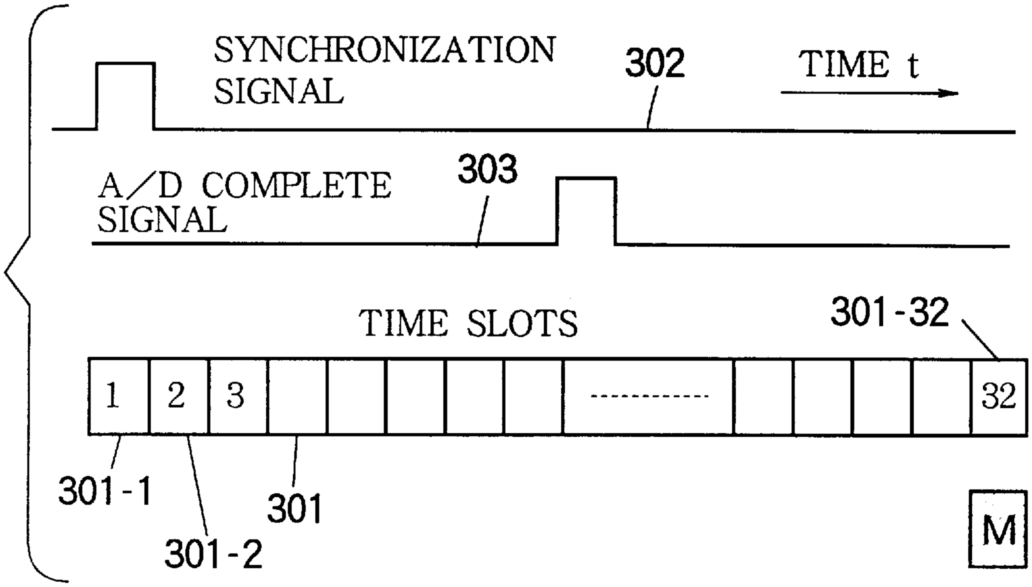
FIG. 3 is a timing chart showing operation of the sound source.

FIG. 3 is a timing chart showing waveform reading operation of the sound source. The sound source 110 operates in the time-divisional manner to multiplex the 32 numbers of the tone generating channels at each time slot 301. The first time slot 301-1 is allotted to operate the first channel by the time-divisional manner. In similar manner, the second time slot 301-2 is allotted to the second channel, the third time slot 301-3 is allotted to the third channel and so on. By such a manner, the first to the last channels are operated by the time-division through one cycle of the time slots 301-1 to 301-32.

The sound source 110 feeds the synchronization signal 302 to the signal line 125 (FIG. 1). The synchronization signal 302 shifts to "1" at the time slot 301-1 allotted to the first channel, and stays at "0" at the remaining time slots 301-2 to 301-32 within one cycle. Namely, the synchronization signal 302 indicates when the first channel is accessed. As shown in FIG. 1, the A/D converter 117 converts the analog external waveform inputted from the amplifier 116 into the corresponding digital external waveform. The A/D converter 117 starts this A/D conversion triggered by the synchronization signal 302. Namely, the A/D converter 117 starts the A/D conversion of the analog waveform when the synchronization signal rises from "0" to "1". Further, the A/D converter 117 holds an A/D complete signal 303 at "1" for a while when the A/D conversion is finished and the converted result is stored in the buffer 118. The A/D complete signal 303 stays at "0" for the remaining time. The sound source 110 recognizes that one sample of the external waveform data is loaded into the buffer 118 when the A/D complete signal is switched to "1". Then, the sound source 110 outputs the A/D address at the time slot allotted to the channel designated and set to treat the external waveform so as to retrieve the same from the buffer 118. In this embodiment, the thirty-second channel is designated to treat the external waveform so that the external waveform data M is retrieved from the buffer 118 into the sound source 110 at the last time slot 301-32.

Figure 4A:
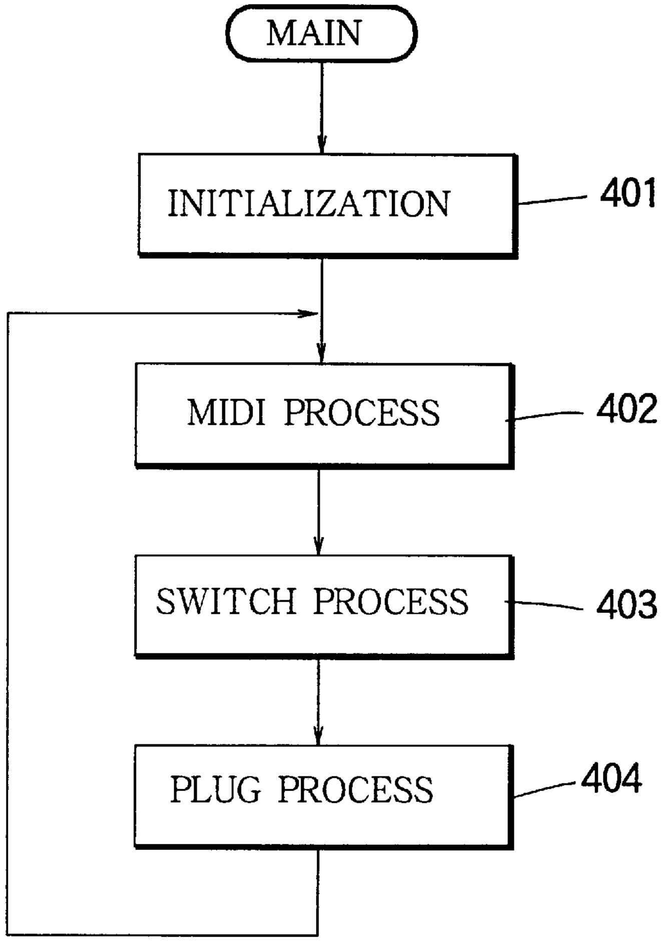
FIGS. 4A and 4B are flowcharts showing operation of the inventive music apparatus.

FIG. 4A is a flowchart showing a main routine executed by the CPU 101 when the electronic musical instrument is turned on. First, various initialization settings are conducted at a step 401. Then, MIDI process is carried out at a step 402. Switch process is carried out at a step 403. Plug process is carried out at a step 404. Then, the routine returns to the step 402. The MIDI process is carried out at the step 402 to detect a MIDI message inputted from the MIDI 104 and to effect corresponding operations according to the MIDI message. The switch process is carried out at the step 403 to detect when the user manipulates the control panel 106 and to effect corresponding operations. The plug process is carried out at the step 404 to detect when the plug is inserted into or removed from the input connector 109 and to perform corresponding operations.

Figure 4B:
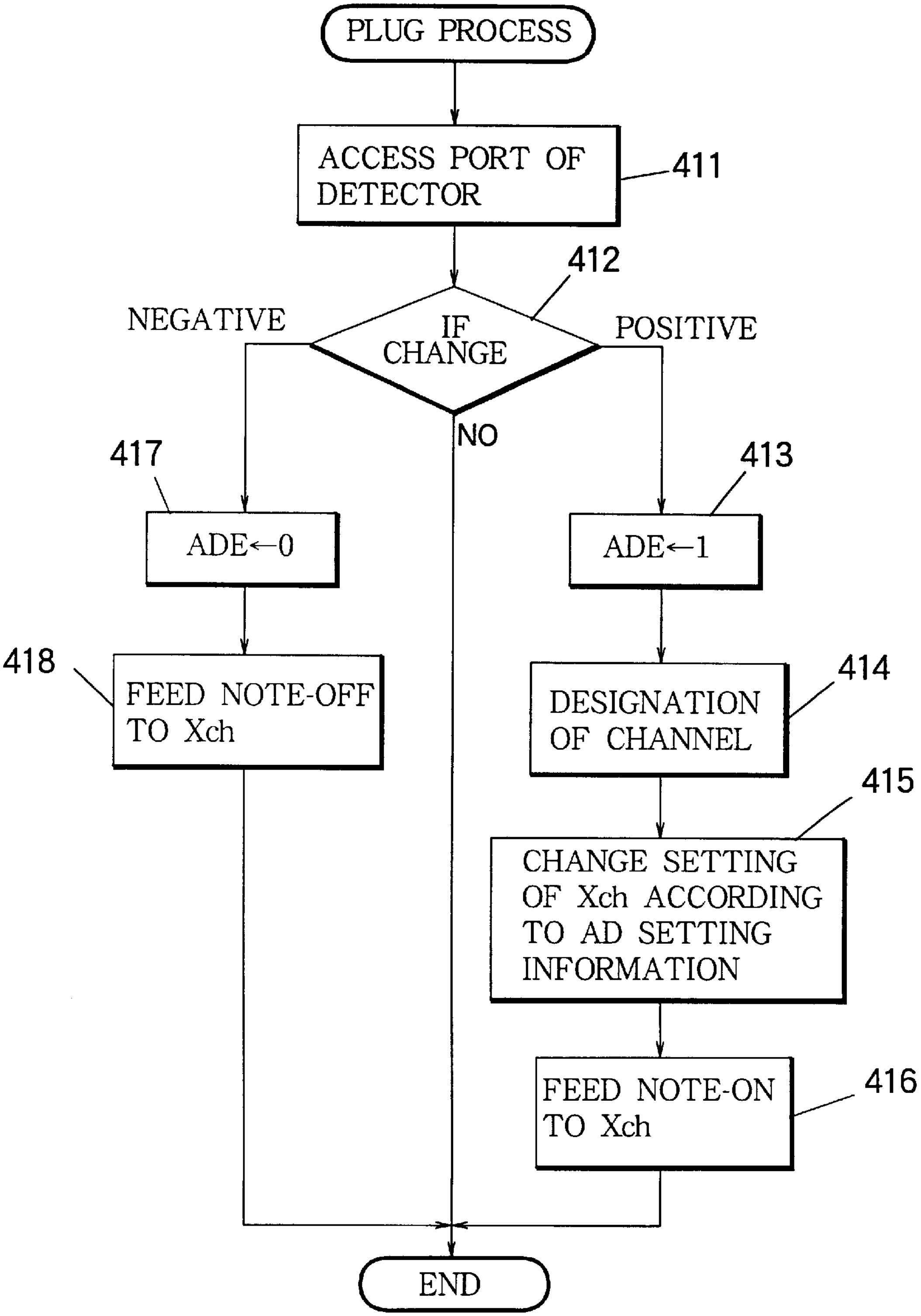

FIG. 4B is a flowchart showing detail of the plug process executed at the step 404 of FIG. 4A. First, the CPU 101 accesses the port of the parallel I/O 105 assigned to the detector 107 at a step 411. Then, the CPU 101 checks at a step 412 as to if status of that port changes. If no change, the routine simply returns. If there is active or positive change that the plug is inserted into the input connector 109, a subsequent step 413 is undertaken to set a register ADE with value "1". The register ADE is set to "1" in the active state where the plug is inserted into the input connector 109 to input the external waveform. Otherwise, the register ADE is set to "0" in the inactive state where the plug is removed from the input connector 109 so that the external waveform is not inputted. Next, the CPU 101 constituting a control device designates at least one of the tone generating channels at a step 414 for treating the external waveform. In this embodiment, the last i.e., thirty-second, channel is exclusively assigned to the external waveform. Generally, the designated channel is indecated by Xch in the flowchart. Then, the control device implemented by the CPU 101 changes the designated channel Xch from the normal setting to the alternative setting at a step 415 such that various parameters are set in the control register 201 for the designated channel Xch according to AD setting information. The AD setting information is prepared in the ROM 102 or RAM 103. In the step 415, this AD setting information is fed to the sound source 110 and written into the control register 201. Particularly, the AD setting information contains the start address ST, the end address EN and the frequency number FN, those of which are arranged to enable the address generator 202 (FIG. 2) to generate the A/D address. Further, the AD setting information contains the effect parameter EFC arranged to apply a desired effect to the external waveform. Then, a note-on command is fed to the designated channel Xch at a step 416. Thereafter, the routine returns.

If the step 412 detects the inactive or negative change upon removal of the plug from the input connector 109, the register ADE is reset to "0" at a step 417 to restore the designated channel Xch from the alternative setting to the normal setting. Then, the CPU 101 feeds a note-off command to the designated Xch channel at a step 418. Thereafter, the routine returns.

Figure 5:
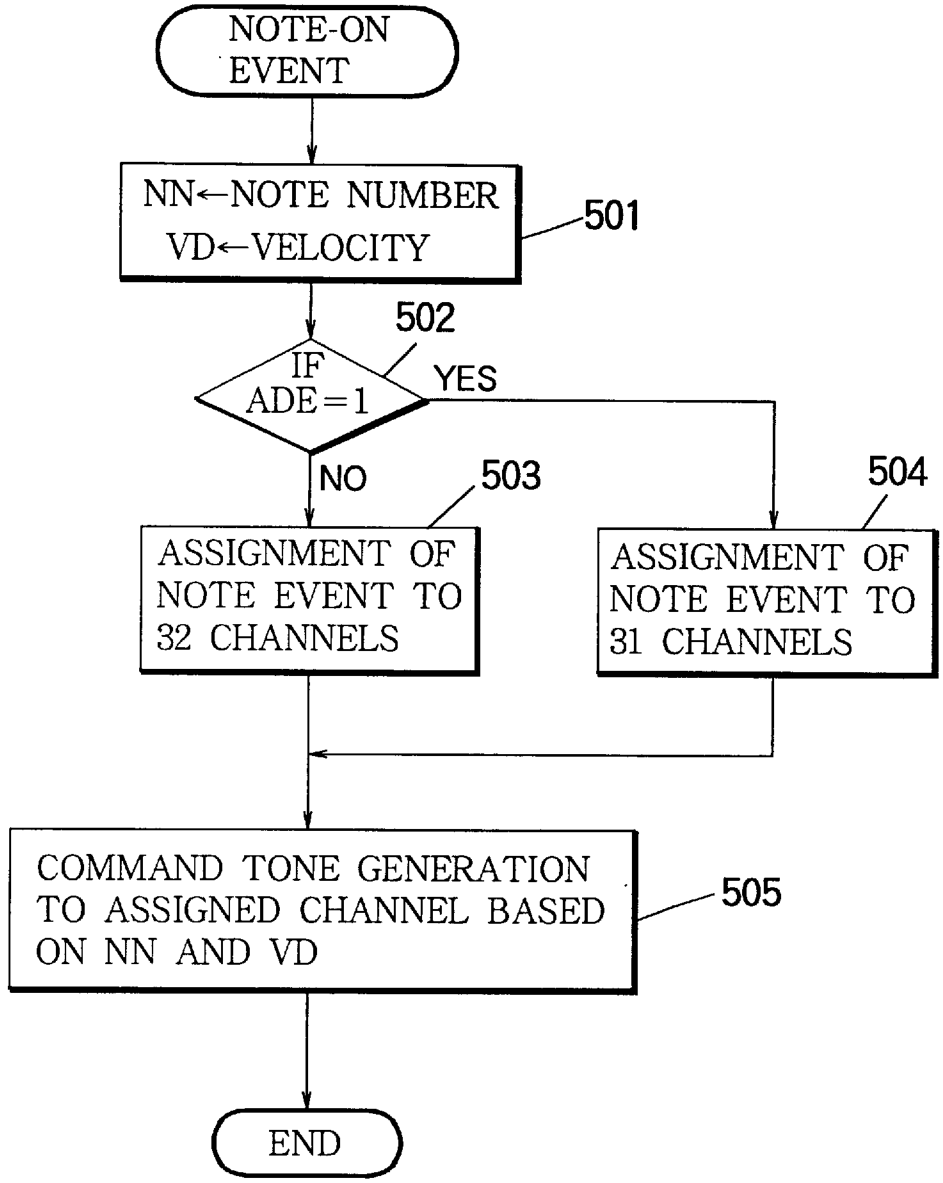
FIG. 5 is a flowchart showing operation of the inventive music apparatus.

FIG. 5 is a detailed flowchart showing note-on event process which is involved in the MIDI process of the step 402 shown in FIG. 4A and which is commenced when a note-on MIDI message is received. First, a step 501 is undertaken according to the received MIDI message indicative of a note-on event such that a note number is set to a register NN and a velocity is set to a register VD. The note number and the velocity characterize the note-on event. Then, check is made at a step 502 as to whether the register ADE is set to "1". If NO, the sound source 110 assigns the note-on event to any available one of the first through thirty-second channels at a step 503 since the plug is removed from the input connector 109 so that all of the channels are placed in the normal setting. If the check result of the step 502 is YES, the note-on event is assigned to any available one of the first to thirty-first channels except for the thirty-second channel. The thirty-second channel is not available since the same is exclusively assigned to the external waveform in case that the plug is inserted into the input connector 109. After either of the steps 503 and 504, the CPU 101 commands the attending channel to generate tones based on the note number NN and the velocity VD at a step 505. Thereafter the routine returns.

As described above, under the active state where the plug is inserted into the input connector 109, the thirty-second channel is reserved to readily admit the external waveform. As illustrated by FIGS. 1–3, the inputted external waveform is subjected to the A/D conversion, and is then fed through the data bus 121 to the sound source 110, where the external waveform is given the desired effect and is mixed with the internal waveform retrieved from the wave table memory 111. Otherwise, under the inactive state where the plug is removed from the input connector 109, the thirty-second channel is made available for the normal tone generation by the wave table reading method.

In the disclosed embodiment, the last channel is assigned for processing of the external waveform. However, other channels than the last channel may be designated for processing of the external waveform. Two or more of the channels may be designated for processing of the external waveform. For example, a pair for channels are selected to process a pair of left and right audio signals inputted by a two-channel stereo device. The channel designated for the external waveform need not be fixed to a particular one of the channels, but any available one of the channels may be dynamically allotted for processing of the external waveform. For example, in the step 414 of FIG. 4B, the CPU 101 searches for an available channel which is currently idling and designates the available channel for processing the external waveform. In case that the thirty-second channel is fixedly used for processing the external waveform, this channel must be once silenced even if the same is currently processing the internal waveform and is then changed for processing the external waveform. Such would cause noise. Further, if the thirty-second channel is currently generating a significant tone, the silencing of this channel must be defered to thereby miss timely processing of the external waveform. The dynamic channel assignment will remove the drawbacks of the static or fixed channel assignment.

Figure 6:
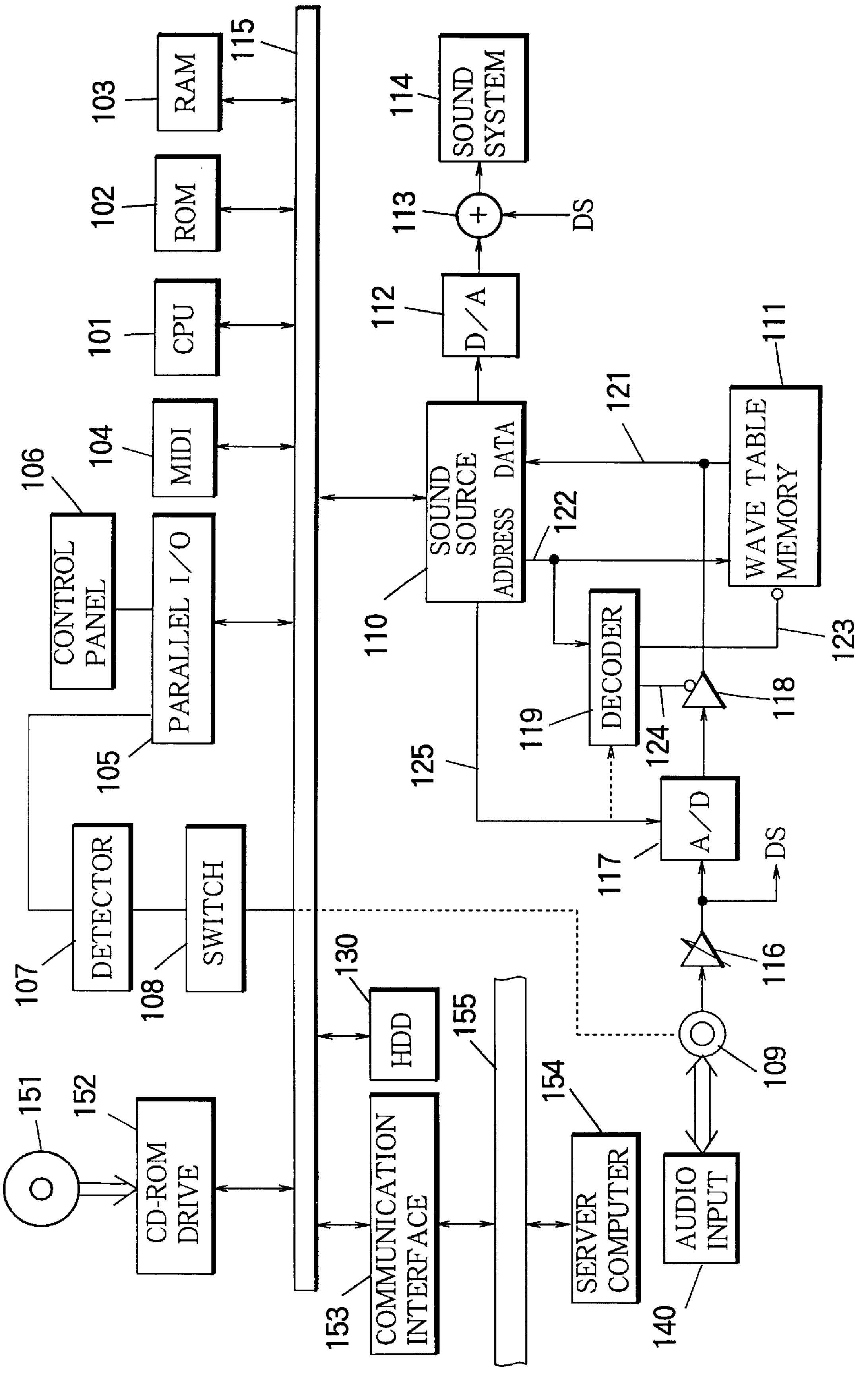
FIG. 6 is a block diagram showing another embodiment of the inventive music apparatus practiced in the form of an electronic musical instrument.

FIG. 6 shows an additional embodiment of the inventive music apparatus. This embodiment has basically the same construction as the previous embodiment shown in FIG. 1. The same components are denoted by the same references as those of the previous embodiment to facilitate better understanding of the additional embodiment. The storage such as wave table memory 111, ROM 102, RAM 103 and hard disk drive (HDD) 130 can store various data such as waveform data and various programs including a system control program or basic program, a waveform reading or generating program and other application programs. Normally, the ROM 102 provisionally stores these programs. However, if not, any program may be loaded into the music apparatus. The loaded program is transferred to the RAM 103 to enable the CPU 101 to operate the inventive system of the music apparatus. By such a manner, new or version-up programs can be readily installed in the system. For this purpose, a machine-readable media such as a CD-ROM (Compact Disc Read Only Memory) 151 is utilized to install the program. The CD-ROM 151 is set into a CD-ROM drive 152 to read out and download the program from the CD-ROM 151 into the HDD 130 through the bus 115. The machine-readable media may be composed of a magnetic disk or an optical disk other than the CD-ROM 151.

A communication interface 153 is connected to an external server computer 154 through a communication network 155 such as LAN (Local Area Network), public telephone network and INTERNET. If the internal storage does not reserve needed data or program, the communication interface 153 is activated to receive the data or program from the server computer 154. The CPU 101 transmits a request to the server computer 154 through the interface 153 and the network 155. In response to the request, the server computer 154 transmits the requested data or program to the music apparatus. The transmitted data or program is stored in the storage to thereby complete the downloading.

The inventive music apparatus can be implemented by a personal computer which is installed with the needed data and programs. In such a case, the data and programs are provided to the user by means of the machine-readable media such as the CD-ROM 151 or a floppy disk. The machine-readable media contains instructions for causing the personal computer to perform the inventive musical sound generating method as described in conjunction with the previous embodiment.

Namely, the inventive machine readable media in the form of the CD-ROM 151 contains instructions for causing the FIG. 6 music apparatus composed of a memory in the form of the wave table memory 111 storing waveform data and a sound source 110 having a plurality of tone generating channels to perform a method comprising the steps of tuning each of the tone generating channels in normal setting to process the waveform data retrieved from the wave table memory 111 so as to generate a musical sound, handling an input device including an audio input 140 such as a microphone to place the same in either of an active state for inputting external waveform data and an inactive state where the external waveform data is not inputted, detecting when the audio input 140 switches between the active state and the inactive state to produce a corresponding detection signal, responding to the detection signal when the audio input 140 switches to the active state for controlling the sound source 110 to change at least one of the tone generating channels from the normal setting to alternative setting to admit and process the external waveform data inputted from the input device so as to generate an additional sound so that the sound source 110 can generate mixture of the musical sound and the additional sound, and otherwise responding to the detection signal when the audio input 140 switches to the inactive state for controlling the sound source 110 to restore said one tone generating channel from the alternative setting to the normal setting so that the sound source 110 generates the musical sound alone.

In a specific form, the sound source 110 includes a multiplexer that sequentially allots a time slot to each of the tone generating channels in time-divisional manner such that each tone generating channel processes the waveform data at the allotted time slot, and an accumulator 206 (FIG. 2) that accumulates the processed waveform data to generate the musical sound. Further, said one tone generating channel operates under the normal setting for sequentially addressing the wave table memory 111 to read out therefrom the waveform data so as to synthesize the musical sound, and otherwise operates under the alternative setting for sequentially admitting the external waveform data from the input device so as to reproduce the additional sound. Moreover, said one tone generating channel operates under the normal setting for processing the waveform data so as to synthesize the musical sound, and otherwise operates under the alternative setting for processing the external waveform data so as to impart an acoustic effect to the additional sound. Preferably, the sound source 110 operates when the audio input 140 is switched to the active state for designating one of the tone generating channels, which is currently not processing the waveform data so that the designated tone generating channel is changed from the normal setting to the alternative setting so as to process the external waveform data.

In a specific form, the input device comprises the audio input 140 such as a microphone for providing an original sound in the form of an analog audio signal DS, a converter 117 for converting the analog audio signal DS into the external waveform data, and a buffer 118 for storing the external waveform data so that said one tone generating channel processes the stored external waveform data so as to generate the additional sound which is a modified form of the original sound. Further, there is a detector device 107 including a switch 108 which is actuated when the audio input 104 is electrically connected to the sound source 110 for detecting the active state of the input device. In such a case, the sound source 110 operates said one tone generating channel to address the buffer 118 to retrieve therefrom the external waveform data, and operates other tone generating channels than said one tone generating channel to address the wave table memory 111 to retrieve therefrom the waveform data.

Figure 7:
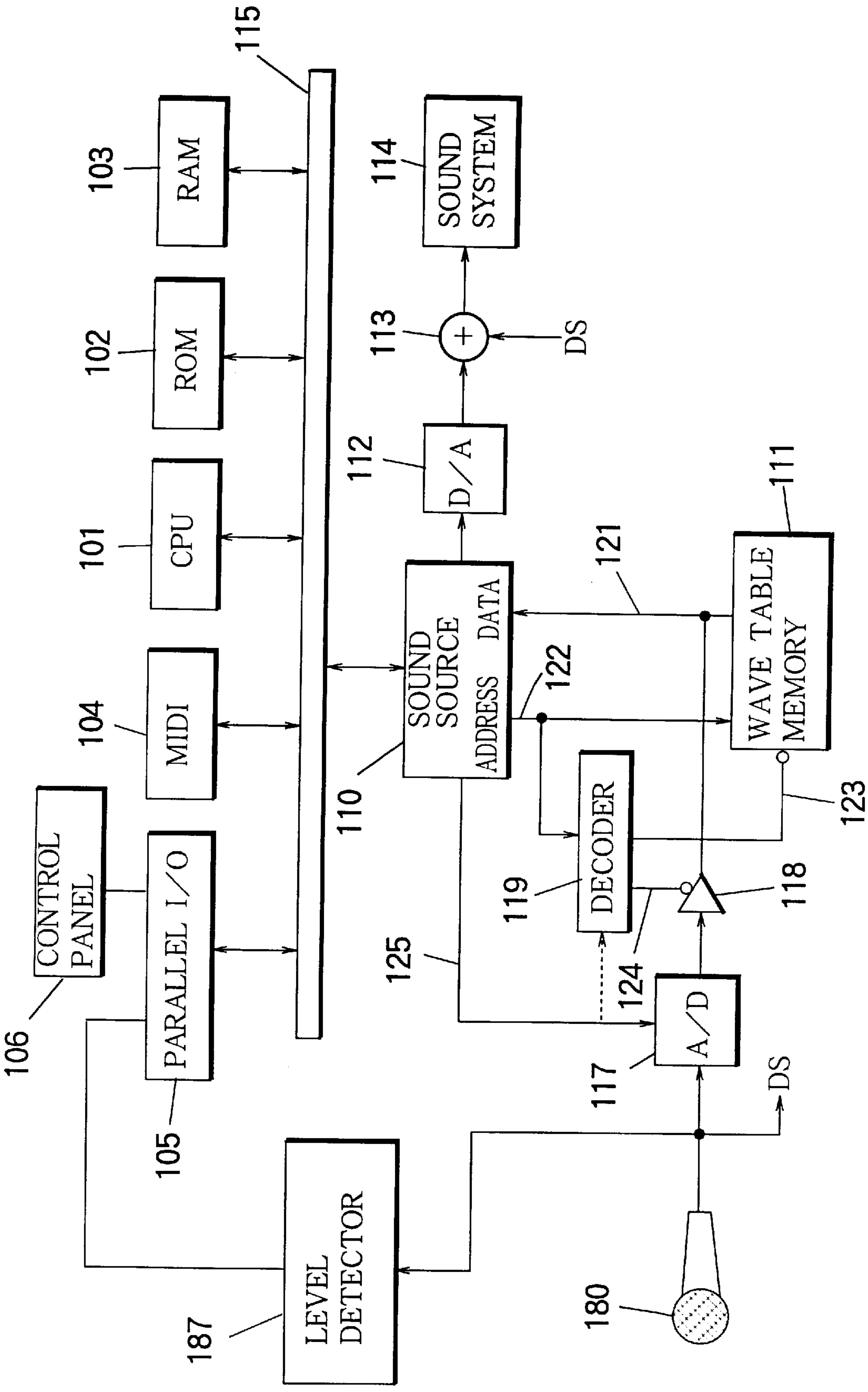
FIG. 7 is a block diagram showing a further embodiment of the inventive music apparatus.

FIG. 7 shows another embodiment of the inventive music apparatus. This embodiment is similar to the previous embodiment shown in FIG. 1, and the same components are labeled by the same reference to facilitate better understanding. As shown in the Figure, a level detector 187 is connected between an input device in the form of a microphone 180 and a parallel I/O 105. The level detector 187 compares an amplitude of an input signal from the microphone 180 with a predetermined threshold level to detect when a voice signal is actually collected by the microphone 180. Generally, any type of detectors can be utilized to detect presence and absence of the voice input.

On the other hand, a control device in the form of a CPU 101 responds to detection results from the level detector 187 to assign one or more of 16 channels of a sound source 110 to the inputted voice signal. The assigned channel is called a "microphone channel". Further, the CPU 101 sets various registers of the microphone channel with a read address for admitting the voice signal and control parameters for controlling processes applied to the voice signal.

In this embodiment, the level detector 187 detects when the microphone 180 actually starts inputting of external waveform data in the form of the voice signal and when the microphone 180 actually stops inputting of external waveform data for notifying the CPU 101 that the microphone 180 switches between the active state and the inactive state. On the other hand, in the previous embodiment of FIG. 1, the plug detector 107 detects when the input device is electrically connected to and disconnected from the sound source 110 through the plug 109 for notifying the CPU 101 that the input device switches between the active state and the inactive state.

As described above, according to this embodiment, the input device including an A/D converter 117 provides the external waveform data to the sound source 110. Further, the internal waveform data is retrieved from a wave table memory 111 and is then fed to the sound source 110 according to performance information. The CPU 101 selectively assigns at least one of the channels of the sound source 110 to either of the external and internal waveform data. When the inputting of the external waveform data is detected by the level detector 187, one of the channels is selected as the microphone channel to treat the inputted external waveform data. By such a manner, the sound source is utilized to apply sound effects to the external waveform data by simple circuit structure. The microphone channel is set only if the external waveform data is actually inputted. If there is no microphone input, the microphone channel is released for treating the internal waveform data. Namely, a limited number of channels can be efficiently utilized to treat both of the internal and external waveform data.

As described above, according to the invention, when it is detected that the external waveform data is allowed for inputting, a particular one of the plural tone generating channels is set to receive and process the external waveform data. Otherwise, when it is detected that the external waveform data is blocked from inputting, the particular channel is reset to the normal state where the internal waveform data is processed according to the wave table reading method. Therefore, the inventive sound source can automatically set and reset the channel designated for the external waveform to thereby facilitate the operation by the user. Further, the external waveform is accepted in the same manner as the internal waveform to thereby feed the external waveform to internal processing circuits such as an effector without complicating circuit structure of the sound source.

What is claimed is:

1. A music apparatus comprising:

a memory device that stores waveform data;

a sound device that has a plurality of tone generating channels, each of which is placed in a normal setting effective to process the waveform data retrieved from the memory device so as to generate a musical sound;

an input device that is placed in either of an active state for inputting external waveform data and an inactive state where the external waveform data is not inputted; and a control device that operates when the input device switches to the active state for controlling the sound device to change at least one of the tone generating channels from the normal setting to an alternative setting effective to admit and process the external waveform data inputted from the input device so as to generate an additional sound so that the sound device can generate a mixture of the musical sound and the additional sound, and that otherwise operates when the input device switches to the inactive state for controlling the sound device to restore said at least one tone generating channel from the alternative setting to the normal setting so that the sound device generates the musical sound alone.

2. A music apparatus according to claim 1, further comprising a detector device that detects when the input device is electrically connected to the sound device and when the input device is disconnected from the sound device for notifying the control device that the input device switches between the active state and the inactive state.

3. A music apparatus according to claim 1, further comprising a detector device that detects when the input device actually starts inputting of the external waveform data and when the input device actually stops inputting of the external waveform data for notifying the control device that the input device switches between the active state and the inactive state.

4. A music apparatus according to claim 1, wherein the sound device includes a multiplexer that sequentially allots a time slot to each of the tone generating channels in a time-divisional manner such that each tone generating channel processes the waveform data at the allotted time slot, and an accumulator that accumulates the processed waveform data to generate the musical sound.

5. A music apparatus according to claim 1, wherein said at least one tone generating channel operates under the normal setting for sequentially addressing the memory device to read out therefrom the waveform data so as to synthesize the musical sound, and otherwise operates under the alternative setting for sequentially admitting the external waveform data from the input device so as to reproduce the additional sound.

6. A music apparatus according to claim 1, wherein said at least one tone generating a channel operates under the normal setting for processing the waveform data so as to synthesize the musical sound, and otherwise operates under the alternative setting for processing the external waveform data so as to impart an acoustic effect to the additional sound.

7. A music apparatus according to claim 1, wherein the sound device operates when the input device is switched to the active state for designating at least one of the tone generating channels, which is currently not processing the waveform data so that the designated tone generating channel is changed from the normal setting to the alternative setting so as to process the external waveform data.

8. A music apparatus according to claim 1, wherein the input device comprises an audio input for providing an original sound in the form of an analog audio signal, a converter for converting the analog audio signal into the external waveform data, and a buffer for storing the external waveform data so that said at least one tone generating channel processes the stored external waveform data so as to generate the additional sound which is a modified form of the original sound.

9. A music apparatus according to claim 8, further comprising a detector device composed of a switch which is actuated when the audio input is electrically connected to the sound device for detecting the active state of the input device.

10. A music apparatus according to claim 8, wherein the sound device operates said at least one tone generating channel to address the buffer to retrieve therefrom the external waveform data, and operates other tone generating channels than said at least one tone generating channel to address the memory device to retrieve therefrom the waveform data.

11. A music apparatus comprising:

memory means for storing waveform data;

sound means having a plurality of tone generating channels, each of which is normally set to process the waveform data provided from the memory means so as to generate a musical sound;

input means placed in either of an active state for inputting external waveform data and an inactive state where the external waveform data is not inputted;

detector means for detecting when the input means switches between the active state and the inactive state; and control means responsive to the detector means and operative when the input means switches to the active state for controlling the sound means to change from the normal setting of at least one of the tone generating channels to enable the same to admit and process the external waveform data inputted from the input means so as to generate an additional sound so that the sound means can generate a mixture of the musical sound and the additional sound, and otherwise being operative when the input means switches to the inactive state for controlling the sound means to restore the normal setting of said at least one tone generating channel so that the sound means generates the musical sound alone.

12. A method of driving a music apparatus composed of a memory storing waveform data and a sound source having a plurality of tone generating channels, the method comprising the steps of:

placing each of the tone generating channels in a normal setting to process the waveform data retrieved from the memory so as to generate a musical sound;

controlling an input device to place it in either of an active state for inputting external waveform data and an inactive state where the external waveform data is not inputted;

detecting when the input device switches between the active state and the inactive state to produce a corresponding detection signal;

responding to the detection signal when the input device switches to the active state for controlling the sound source to change at least one of the tone generating channels from the normal setting to an alternative setting to admit and process the external waveform data inputted from the input device so as to generate an additional sound so that the sound source can generate a mixture of the musical sound and the additional sound; and otherwise responding to the detection signal when the input device switches to the inactive state for controlling the sound source to restore said at least one tone generating channel from the alternative setting to the normal setting so that the sound source generates the musical sound alone.

13. A machine readable media containing instructions for causing a music apparatus composed of a memory storing waveform data and a sound source having a plurality of tone generating channels to perform a method comprising the steps of:

placing each of the tone generating channels in normal setting to process the waveform data retrieved from the memory so as to generate a musical sound;

controlling an input device to place it in either of an active state for inputting external waveform data and an inactive state where the external waveform data is not inputted;

detecting when the input device switches between the active state and the inactive state to produce a corresponding detection signal;

responding to the detection signal when the input device switches to the active state for controlling the sound source to change at least one of the tone generating channels from the normal setting to an alternative setting to admit and process the external waveform data inputted from the input device so as to generate an additional sound so that the sound source can generate a mixture of the musical sound and the additional sound; and otherwise responding to the detection signal when the input device switches to the inactive state for controlling the sound source to restore said at least one tone generating channel from the alternative setting to the normal setting so that the sound source generates the musical sound alone.

* * * * *